(12) United States Patent
Kuhlke et al.

(10) Patent No.: US 7,865,552 B2
(45) Date of Patent: Jan. 4, 2011

(54) RICH-MEDIA INSTANT MESSAGING WITH SELECTIVE RICH MEDIA MESSAGING BROADCAST

(75) Inventors: Matthew Kuhlke, San Francisco, CA (US); Fadi Jabbour, Sunnyvale, CA (US); Eric Lee, San Jose, CA (US); David Lee, Sunnyvale, CA (US); Glenn Inn, San Mateo, CA (US)

(73) Assignee: Cisco Technology, Inc., San Jose, CA (US)

( * ) Notice: Subject to any disclaimer, the term of this patent is extended or adjusted under 35 U.S.C. 154(b) by 245 days.

(21) Appl. No.: 11/782,519

(22) Filed: Jul. 24, 2007

(65) Prior Publication Data
US 2009/0030988 A1 Jan. 29, 2009

(51) Int. Cl.
*G06F 15/16* (2006.01)
(52) U.S. Cl. .................. 709/204; 709/205; 709/206
(58) Field of Classification Search .................. 709/204
See application file for complete search history.

(56) References Cited

U.S. PATENT DOCUMENTS 7,058,036 B1 * 6/2006 Yu et al. .................... 370/335
2003/0208543 A1 * 11/2003 Enete et al. ................. 709/206
2005/0210505 A1 * 9/2005 Chiu et al. .................... 725/43
2006/0031340 A1 * 2/2006 Mathew et al. .............. 709/206
2007/0121530 A1 5/2007 Vadlakonda et al.
2007/0291107 A1 * 12/2007 Kang ...................... 348/14.01
2009/0113304 A1 * 4/2009 Mercier et al. .............. 715/719

* cited by examiner

*Primary Examiner*—Firmin Backer
*Assistant Examiner*—Arvin Eskandarnia
(74) *Attorney, Agent, or Firm*—Fish & Richardson P.C.

(57) ABSTRACT

In one embodiment, a method for sending a video message and a text message in a communication session is provided. The method includes determining when a contextual trigger is detected in the communication session between a first user and a second user. For example, the contextual trigger may be when a first user focuses on a window being used for the communication session. The first user may then input a text message. A video message of the first user in the communication session is also determined. The video message is determined based on when the contextual trigger is determined. For example, the video message may include video from a time before when the contextual trigger is determined, such as 10 or 20 seconds before, until a time when the first user is finished inputting the text message. The text message and video message are then sent to a second user.

23 Claims, 7 Drawing Sheets

RICH-MEDIA INSTANT MESSAGING WITH SELECTIVE RICH MEDIA MESSAGING BROADCAST

TECHNICAL FIELD

Particular embodiments generally relate to communication systems

BACKGROUND

Users have a variety of options to communicate with each other. For example, users may participate in a textual instant messaging (IM) session, a telephone call, or a video session. A textual IM session allows users to send text messages to each other in substantially real time. However, the communication is text-based and thus some sort of interaction between users is lost. A video session enables users to converse with each other in an environment that is almost akin to a face-to-face meeting. However, the complexity of setting up a video session has hindered the adoption of video technology. Also, some users may be leery of always being on display or being continually watched by another user during the video session. The traditional phone call provides a verbal exchange between users. However, there are some situations during the phone call when a user may want to visually see the other person.

In a video session or telephone call, a user is either always on display or has to devote their attention to talking to one user. Accordingly, practically speaking, users just limit themselves to a single video session or single telephone call session. However, many users often participate in multiple IM sessions at one time. They may not send text messages to all users continually but may participate in multiple conversations over a long period of time. By using IM, users lose the interactivity of a video session. Users may set up a video feed on their IM client; however, the problem of always being on display still exists. Additionally, sending video to multiple users simultaneously may use a large amount of bandwidth and be undesirable.

DESCRIPTION OF EXAMPLE EMBODIMENTS

Overview

In one embodiment, a method for sending a video message and a text message in a communication session is provided. The method includes determining when a contextual trigger is detected in the communication session between a first user and a second user. For example, the contextual trigger may be when a first user focuses on a window being used for the communication session, such as a user may mouse over the window, select the window, start typing in the window, etc. The first user may then input a text message. A video message of the first user in the communication session is also determined. The video message is determined based on when the contextual trigger is determined. For example, the video message may include video from a time before when the contextual trigger is determined, such as 10 or 20 seconds before, until a time when the first user is finished inputting the text message. The text message and video message are then sent to a second user. Because video message includes video from before the contextual trigger is determined, the second user may see the first user's reaction when he/she is reading a text message from the second user. Also, the video message that is sent is based on the contextual trigger and thus video of the first user is not continuously being sent to the second user. Rather, the video is sent for a time when a user is most likely actively involved in the conversation.

Example Embodiments

Figure 1:
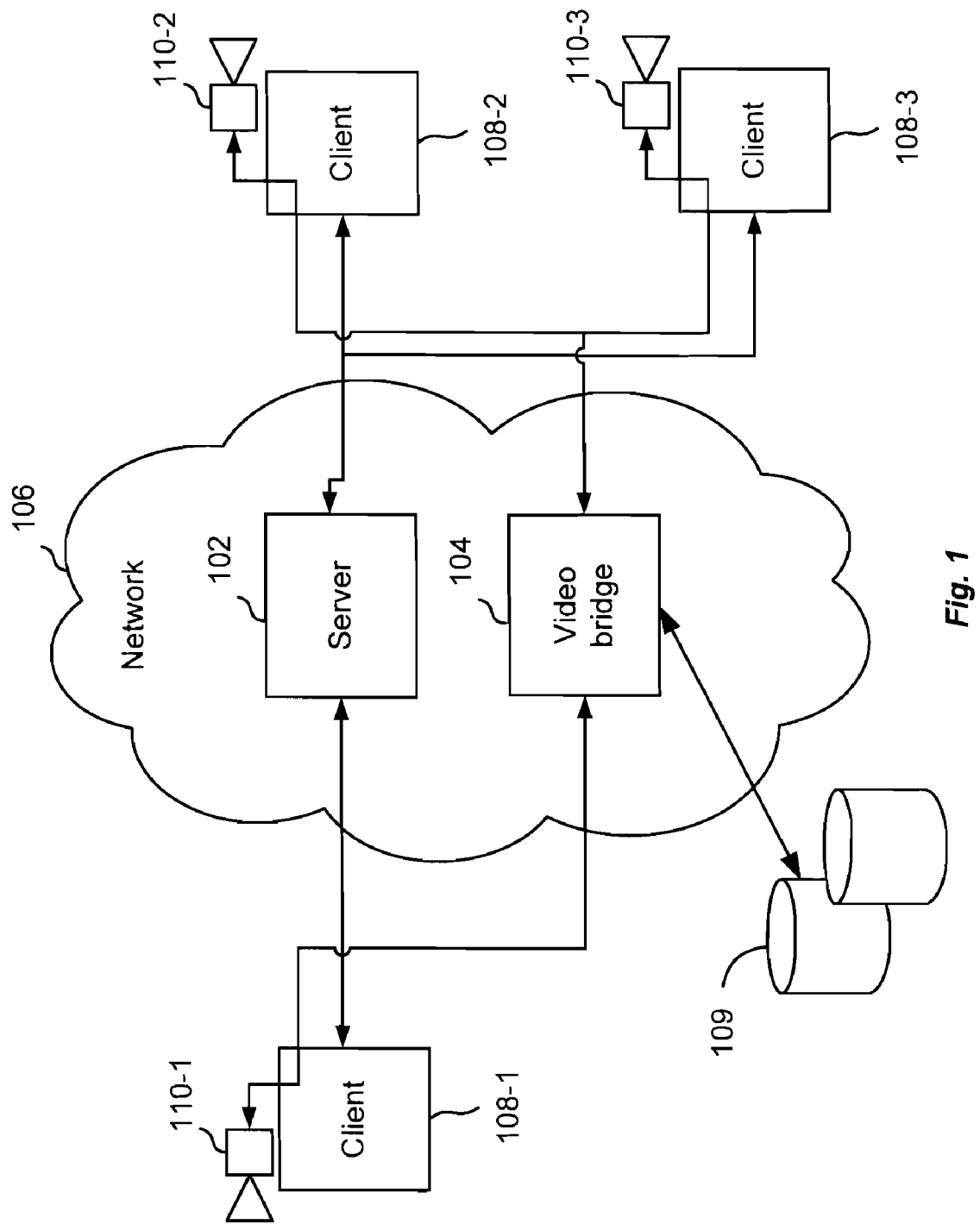
FIG. 1 depicts an example of a system for sending video and text messages.

FIG. 1 depicts an example of a system for sending video and text messages. Although this system is shown, it will be understood that other elements may also be included and variations may also be appreciated.

A server 102 is configured to facilitate textual messaging among client 108-1, client 108-2, and client 108-3. Server 102 may be any suitable network device, such as an IM server, router, switch, etc. In one embodiment, server 102 provides instant messaging between client 108-1 and client 108-2 and between client 108-1 and 108-3.

Clients 108 may include a computing device that is used by a user. For example, client 108 may include a personal computer (PC), laptop computer, smart phone, personal digital assistant (PDA), cellular phone, etc.

Clients 108 may also include an application that facilitates text messaging. For example, an instant messaging client, web browser, etc. may be used. Clients 108 may also facilitate transmission of video with the text messaging. The video may be any rich media, such as video, audio/video, animation, etc. The video may also include static images, text, or other information. The video may be shown in a window that is in the same window where text messaging is being performed. Also, the video may be shown in a separate window, such as in a media player.

Camera 110 may be any capture device configured to capture video. Also, camera 110 may capture audio or any other information. Camera 110 may communicate video to a video bridge 104. Although video bridge 104 is shown as being separate from server 102, it will be understood that video bridge 104 may or may not be included in server 102. A network video storage system, 109, may be used for network-based retention of video messages. Video bridge 104 may enable video to be sent among clients 108-1, 108-2, and 108-3 as well as to a network storage system 109. Network storage system 109 may store the video for future use. For example, the video may be played back when requested by a user. Also network storage may be used when video messages are determined in network 106, as described in FIG. 7.

Server 102 and video bridge 104 may be found in network 106. Network 106 may include any packet-based network, a cellular network, local area network (LAN), wide area network (WAN), etc.

Particular embodiments provide a video and text messaging session. Users can participate in a text messaging session, such as an instant messaging session, in addition to participating in a video session. In one embodiment, video of a user may be continuously captured by camera 110; however, a continuous feed of video may not be sent to clients 108 at all times. Rather, a contextual trigger is determined and used to select what video information is sent with a text message. For example, a contextual trigger may be when focus by a user is detected. The focus may be any indication that a user is focusing their attention to a communication session. The focus may be detected when a user mouses over a window, clicks on a window, starts typing in a window, etc. Further, other intelligence may be used to determine when a user has focused their attention to a window. For example, video may be analyzed to determine when a user is sitting in front of and looking at an open window.

When a contextual trigger is detected (i.e., the user has focused their attention on a window), a slice of video may be determined that may be sent with a text message. For example, a user may start to type a text message and then choose to send the text message. When this occurs, a video message including a portion of captured video is determined and sent with the text message. The video is determined based on when the contextual trigger is determined. In one embodiment, a flinch factor feature is provided that sends video from a time that is before the contextual trigger is determined. For example, a user may start typing a message, which may be the contextual trigger. However, before the user started typing the message, the user may have been reading a prior text message sent by the other user. It may be desirable to capture the user's reaction to reading the text message, such as the user may smile, laugh, etc. upon reading the text message. The video message may also include video of the user until substantially around when the text message is sent. As will be discussed in more detail below, the video message may be determined at client 108 and sent. Also, client 108 may determine parameters for the video message, which are sent to another device that can generate the video message using the parameters.

Figure 2:
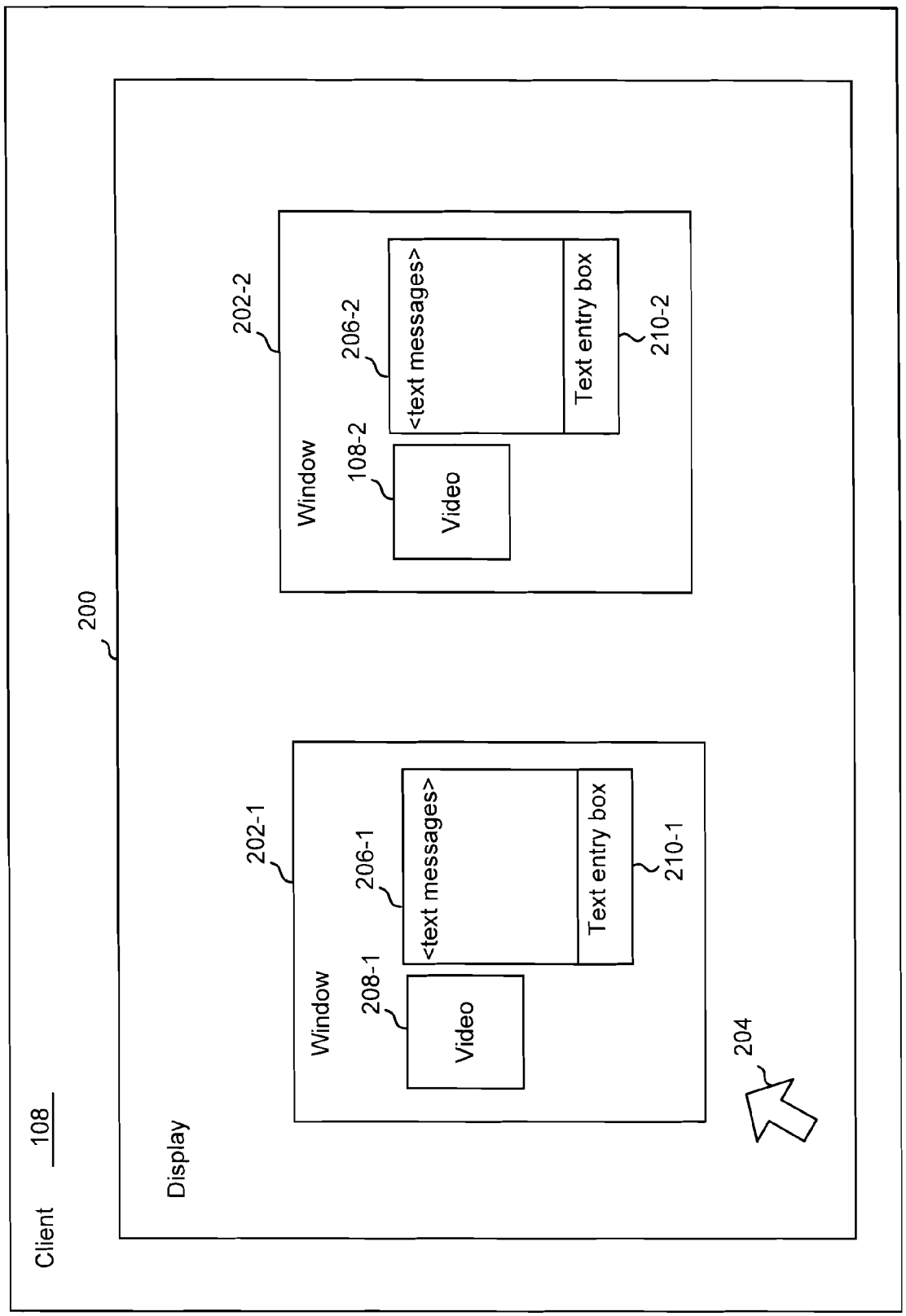
FIG. 2 shows an example of a display on a client.

A user of client 108 may have multiple video and text messaging sessions active at one time. FIG. 2 shows an example of a display 200 on client 108. Display 200 includes multiple windows 202 for different video and text messaging sessions. For example, window 202-1 may be for a communication session between client 108-1 and client 108-2 (e.g., a conversation between a first user and a second user) and window 202-2 is for a communication session between client 108-1 and client 108-3 (e.g., a conversation between the first user and a third user).

As shown, a text message window 206 and a video window 208 are provided. Text message window 206 allows a first user to see text messages from a second user. Also, a text entry box 210 is provided that allows the first user to enter in a text message that the first user wants to send to the second user.

Video window 208 shows video received from other users. When video is not being received, a static image, such as the last frame of a previously displayed video, an icon, or other information, may be displayed. For example, when a second user becomes inactive, such as the focus is removed from a window being used by the second user (not shown), then a static image may be displayed on a user's window 202-1. Thus, the user can visually determine if he/she has the other person's attention. Text message window 206 may be separate from video message window 208 or may be part of or combined with video message window 208.

The first user may not be actively participating in a video and text messaging session with a second user and a third user at all times. For example, at one point the user may be typing a message in window 202-1. At another point, a user may read a message from window 202-2 and type a response message. Also, the first user may be doing something else and may not be actively participating in either of the video and text messaging sessions with the second user and third user.

When a user wants to actively participate in the video and text messaging session, the user may direct focus onto a window 202. For example, a pointer 204 may be used to provide the focus. In one example, pointer 204 may be moused over window 202-1, may be used to select window 202-1, etc. Also, other ways of providing focus may be used, such as using a keyboard shortcut, touching a touch screen, beginning to type in window 202, etc.

Any of the methods of providing a focus on window 202-1 may be detected as a contextual trigger. The contextual trigger may indicate an interest in user for actively participating in the video and text messaging session.

Figure 3:
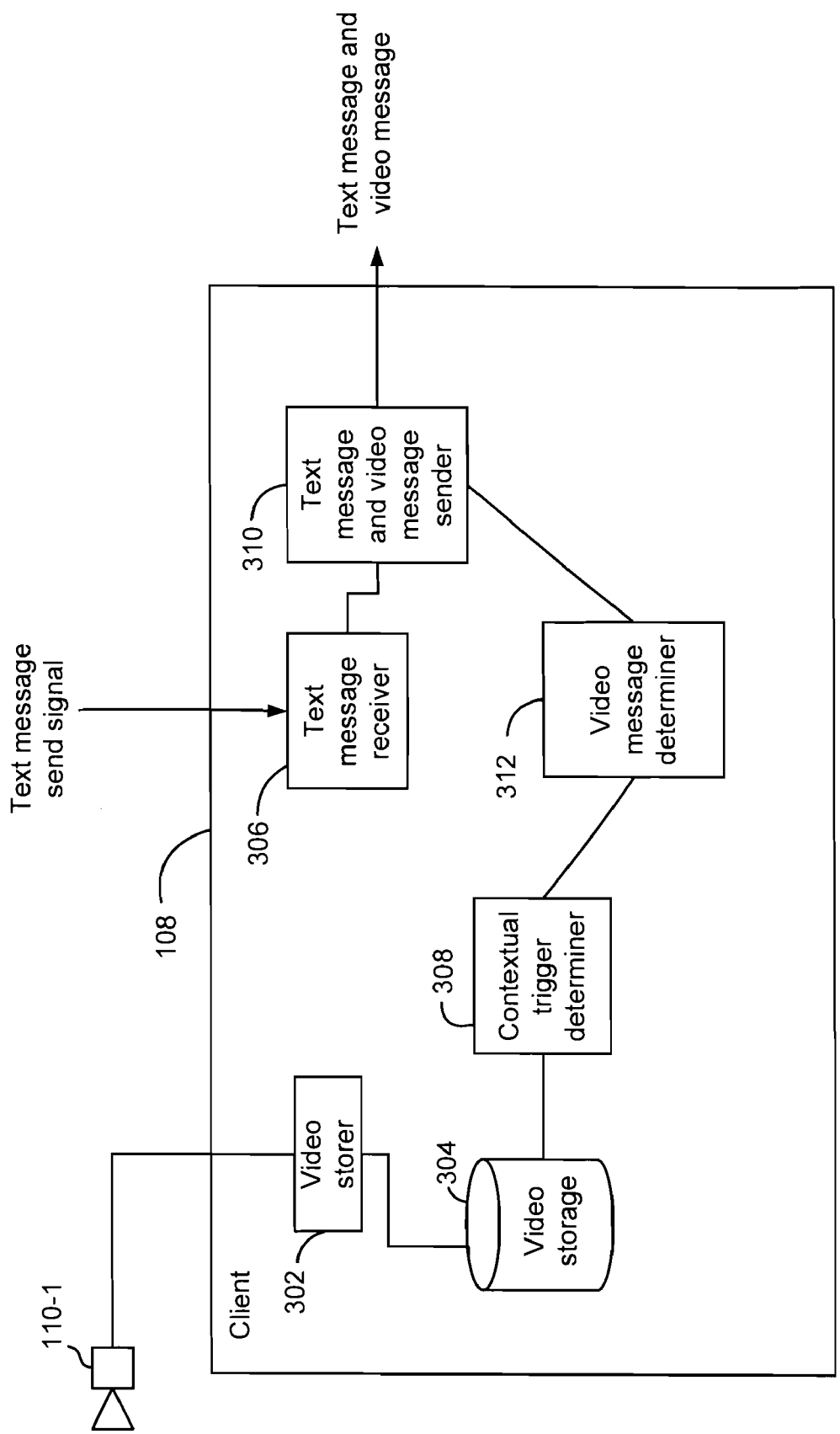
FIG. 3 depicts a more detailed example of a client for determining a video message to send with a text message.
Figure 7:
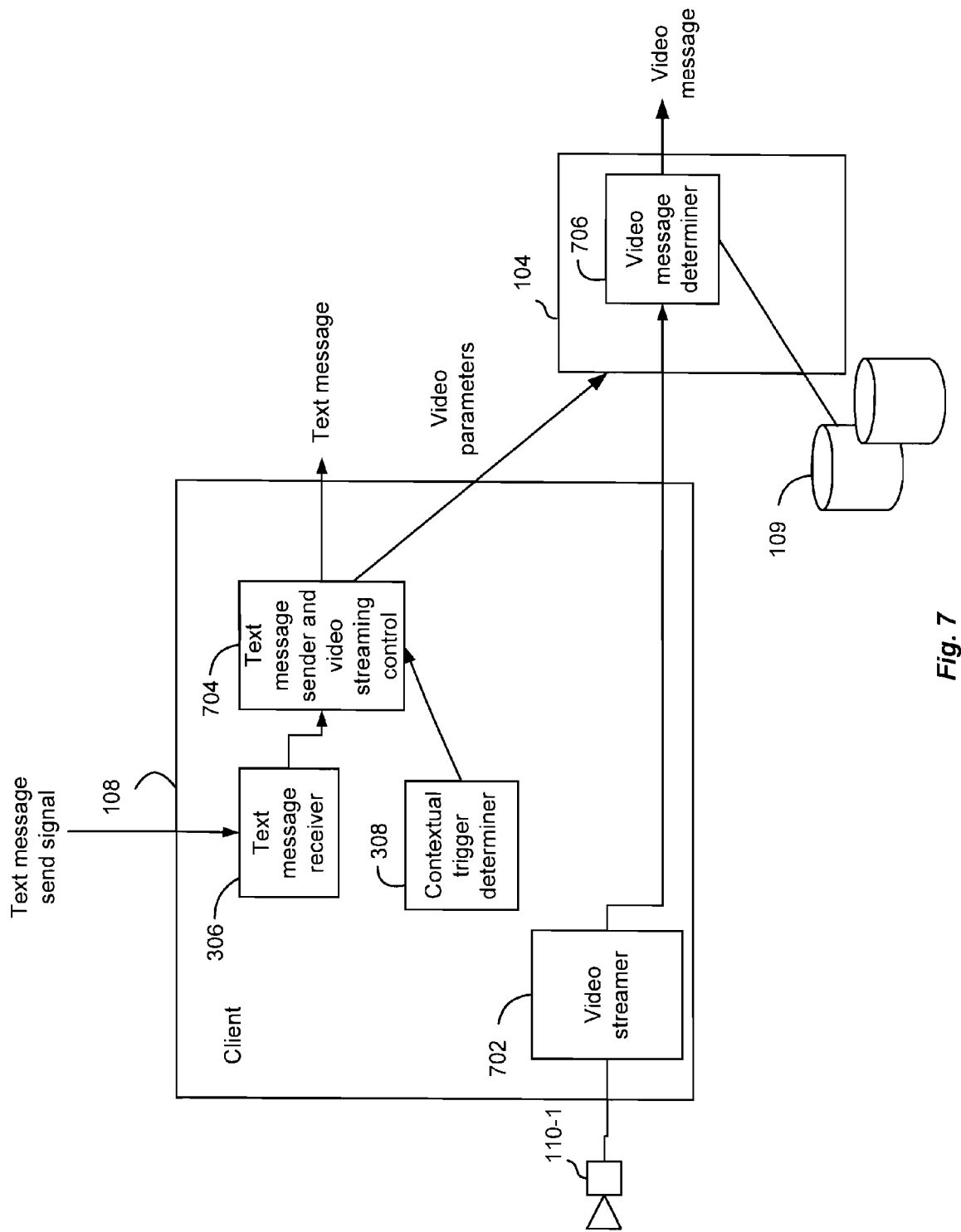
FIG. 7 depicts another example of sending a video message.

As discussed above, a video message and a text message is sent between clients 108. FIG. 3 depicts a more detailed example of client 108 for determining a video message to send with a text message. Although FIG. 3 is described with respect to client 108, it will be understood that the functions described may also be performed by other devices. For example, FIG. 7 depicts another example of a method for sending a video and text message. A video storer 302 is configured to store video received from camera 110. In one embodiment, video storer 302 stores a continuous feed of video from camera 110. Thus, no matter what window 202 a user is actively using, video storer 302 may be storing video captured by camera 110. In one embodiment, the video is stored in video storage 304, which may be a cache, read only memory, flash memory, etc.

A text message receiver 306 is configured to determine a text message that is input by a user. For example, the user may be reading a text message that has been received in text message window 206. After reading the message, the user may type a message in text entry box 210. When the user is finished typing the message, the user may send the message by either selecting a send button, pressing enter on a keyboard, or using any other methods.

A contextual trigger determiner 308 is configured to detect a contextual trigger. For example, when a user performs any actions that put focus on window 202-1 or 202-2, contextual trigger determiner 308 determines which window the focus is on.

A video message determiner 312 may then determine video to send with a video message. The video determined may be based on a time the contextual trigger is determined. A predetermined period before the time the contextual trigger is determined may be used to select the video. For example, ten seconds before the contextual trigger may be the predetermined time. The video message may thus include video information from ten seconds before a user provides focus on window 202 until the user elects to send the text message.

The video message may be determined in different ways. For example, when the focus is detected, video is captured and stored in a file in storage 304. When it is time to send a video message, a slice of the video is retrieved from the file to form a video message. In another example, the video being captured may be forked to a new file when the trigger is detected. For example, video from a pre-determined time is stored in a new file, and as new video is received, such as when the user is typing a message, it is stored in the new file. The new file is then sent when the text message is sent.

Also, the video message may be in the form of streaming video. For example, when a contextual trigger is detected, video message determiner 312 may stream video to text message and video message sender 310, which may then send the video to another client 108. The video may continue to be sent until focus is removed. For example, the user may move the mouse away from window 202, stop typing, etc.

Text message receiver 306 may receive a send signal from window 202. Text message receiver 306 then determines the text message that should be sent and video message determiner 312 also determines the video message.

A text message and video message sender 310 then sends the text message and video message to another client 108. For example, the text message may be sent and displayed in text message window 206. Also, the video may be streamed to a client 108-2 and displayed in the video window 208. The text message and video message may be sent concurrently. Also, they may be sent at different times. For example, the video may be sent while the user is typing the text message.

At the receiving client, the video in the video message may be played immediately. Thus, a second user participating in the conversation can see the video of the first user reading the last text message and typing a new message. Also, the video may not be played immediately. For example, client 108-2 may wait until a contextual trigger is received for a window 202-2. In one example, if the video is played right away, the user may not be ready to look at the video (e.g., the user may not be looking at the window). However, when the user put focus on window 202-2, the video information may be played in video window 208-2. The user may then read the text message (which may be displayed right away) and also view the video. By viewing the video, the second user can see the reaction of the first user as the first user was possibly reading the previous message sent by the second user. This provides a good context as to the reaction of the first user. For example, the second user can tell if the first user thought the previous message was funny, sad, etc.

By only sending video when the first user is actively participating in the conversation, then the first user may not feel that they are always being watched by the second user. This may be important when the first user is multi-tasking and participating in multiple video and text messaging sessions. Thus, the first user's reaction to activities they are doing is not seen by the second user if the first user does not really want the second user to see. Also, the first user can have the choice to view the video about to be sent along with the text message. After viewing the video, the user may opt to send the text message without the video or to not send the text message altogether.

Figure 4:
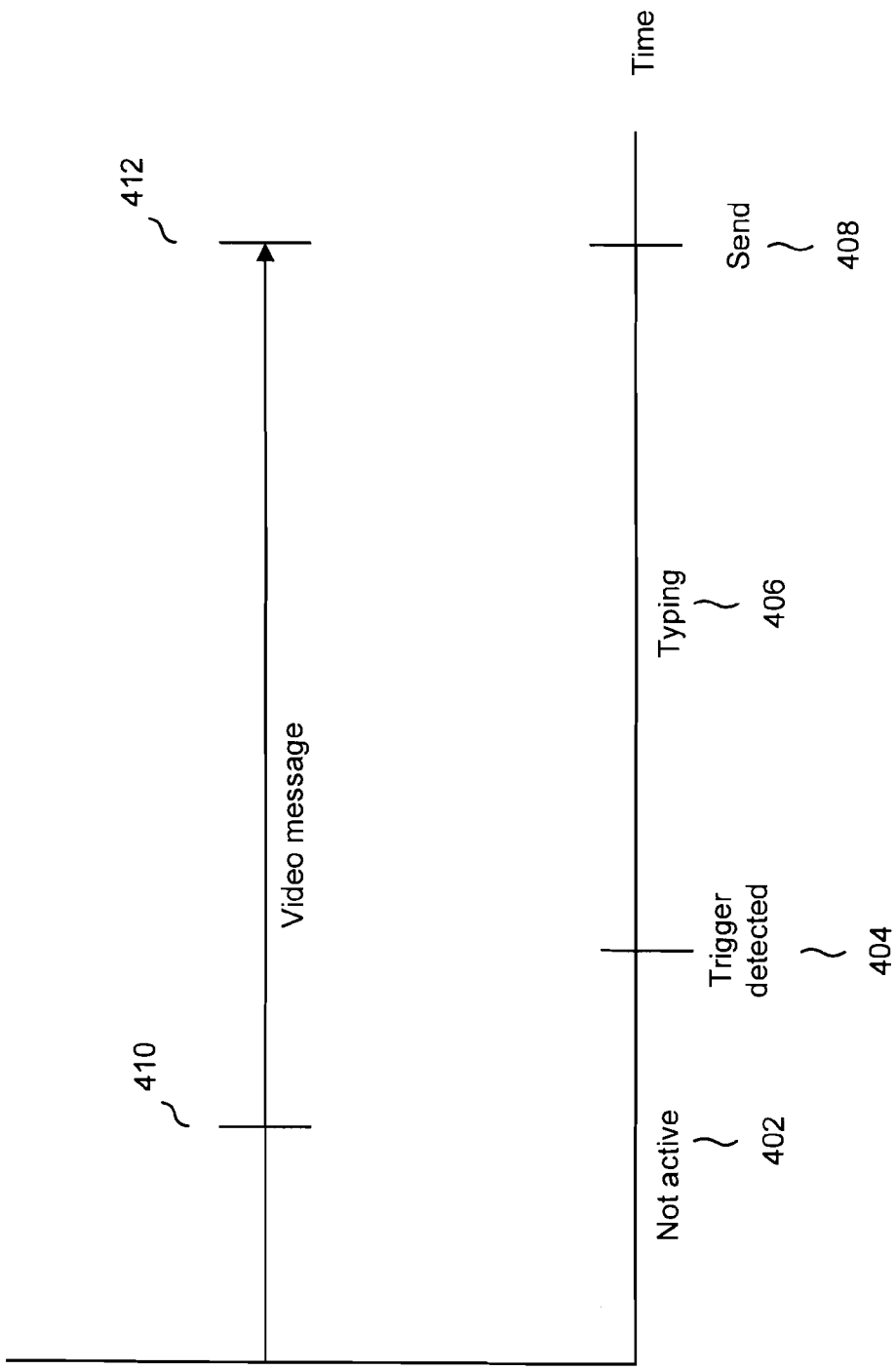
FIG. 4 shows a timeline of events that may occur.

FIG. 4 shows a timeline of events that may occur. At 402, a user is not active in a video and text messaging session. However, video is being captured during this time.

At 404, a contextual trigger is detected. For example, the user may have moved pointer 204 over window 202.

In a period around 406, the user may be typing a message. At 408, the user may then decide to send the message either by selecting the send button or hitting enter on a keyboard.

As shown, video information for sending to client 108-1 is between a time 410 and a time 412. Time 410 is before a time when the contextual trigger is detected at 404. Time 412 is substantially around the time at which user decided to send the message at 408. Although a time 412 is determined, it will be understood that this time may vary. For example, the time may be a little bit before or after the time the user decides to send the message. However, a point before the contextual trigger is detected is used so that the second user can see any change in reaction as the first user starts to read the message.

Figure 5:
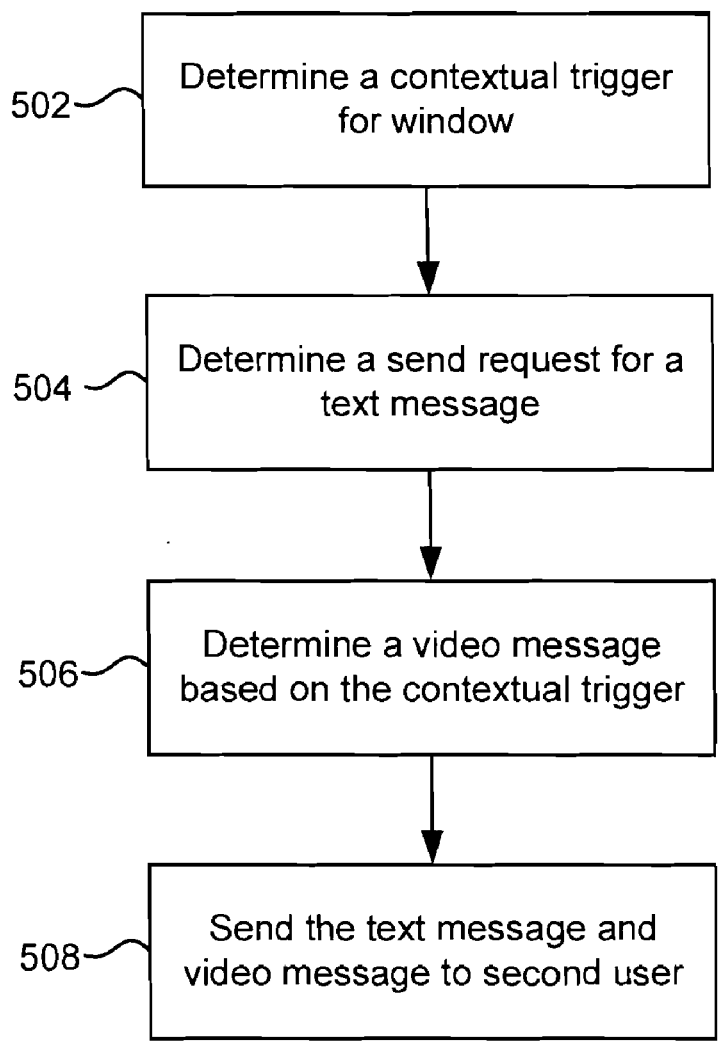
FIG. 5 depicts an example of a method for sending video and text messaging.

FIG. 5 depicts an example of a method for sending video and text messaging. Step 502 determines a contextual trigger for window 202.

Step 504 then determines a send request for a text message. For example, the user may have entered a text message into window 202 and selected a send button.

Step 506 determines a video message based on the contextual trigger. As discussed above, the video included in the video message may be before the contextual trigger was detected.

Step 508 then sends the text message and video message to second user. The above method may continue as client 108-1 and client 108-2 participate in a video and text messaging conversation.

The video messages may be sent in discreet messages. For example, the video may be cached and sent only when a user sends a text message. At that time, the video may be streamed or sent in packets. Also, after the video message is sent, the video may continue to stream if the focus is still on the window. However, if typing is the trigger, then the video may stop being sent.

Figure 6:
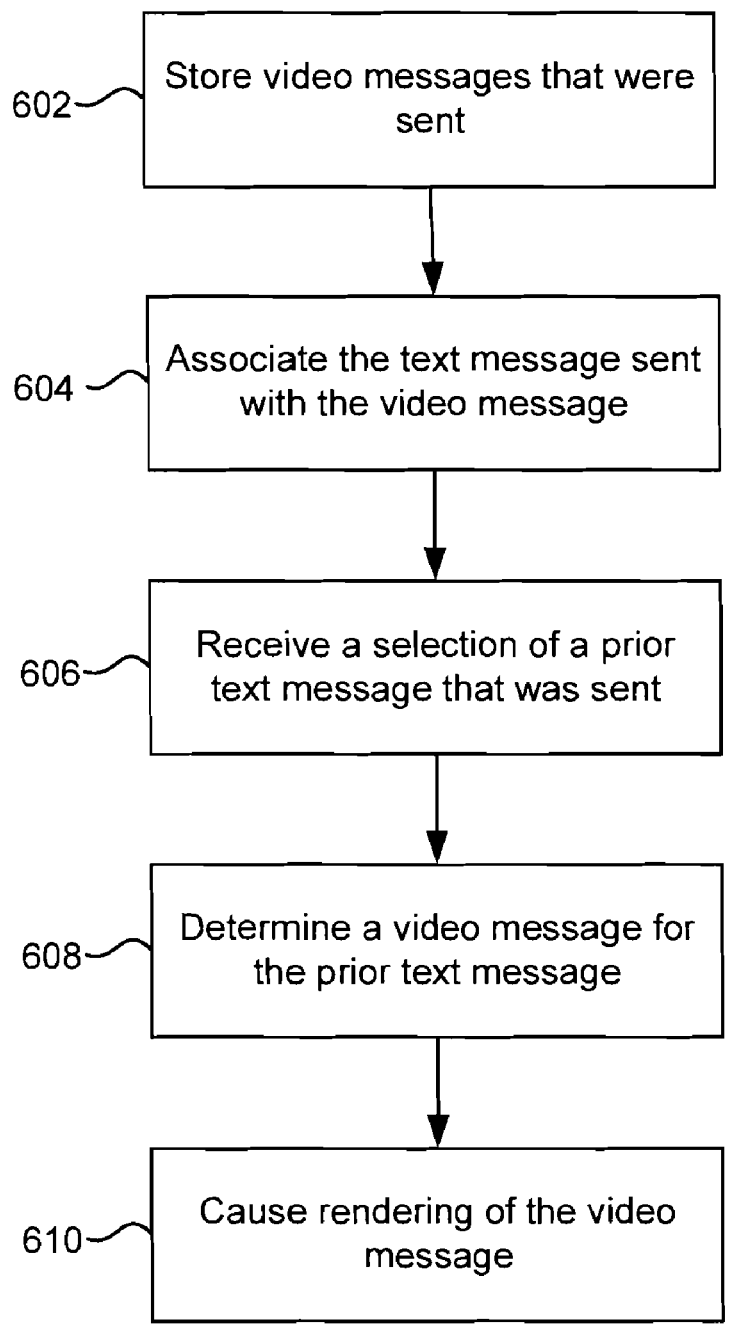
FIG. 6 depicts an example of a method of providing playback of video messages.

A user may decide to replay certain video messages that were previously received. FIG. 6 depicts an example of a method of providing playback of video messages. Step 602 stores video messages that were sent. For example, as video messages are sent with each text message, they may be stored somewhere. For example, the video messages may be stored in network 106, such as at server 102 or video bridge 104. Also, the video messages may be stored at the receiving client, such as client 108-2 or a sending client, such as client 108-1.

Step 604 associates the text message sent with the video message. For example, a pointer to the text message may be provided. This cross-references the text message and the video message.

Step 606 receives a selection of a prior text message that was sent. For example, a user may select a text message in text message window 206. In one example, text message window 206 may record a running conversation of text messages sent in the text messaging session and the user may select a previous text message in the conversation.

Step 608 then determines a video message for the prior text message. For example, the index is used to determine the video message that was sent with the prior text message.

Step 610 then causes rendering of the video message. For example, the video message may be rendered in video window 208.

In one example, if the video message is stored in network 106, video server 102 or video bridge 104 may receive an indication that the prior text message has been selected. The corresponding video message is then determined and sent to client 108-2. Client 108-2 may then render the video message in video window 208.

In other embodiments, the video messages may be cached at client 108-2 and thus may be retrieved and displayed by client 108-2. Also, client 108-1 may be contacted and may then resend the video message corresponding to the text message.

FIG. 7 depicts another example of sending a video message. In this example, client 108 may stream video to video bridge 104, which stores the video. Then, client 108-1 sends a text message with an indication of some parameters for a video message (e.g., a time), and then video bridge 104 determines the video and sends it to client 108-2.

As shown, a video streamer 702 receives video from capture device 110. Video streamer 702 then sends the video to video bridge 104. The video may then be stored in network storage 109.

When a user inputs a text message for another user, the contextual trigger may be detected as described above. Also, text message sender and streaming video control 704 determines parameters for the video message. For example, the time period for video that should be included in the video message may be determined. The time period may be a predetermined time before the contextual trigger to when the text message was sent. Also, text message sender and streaming video control 704 may note an identifier for the text message. For example, the username of the recipient, a communication identifier, etc. may be determined to identify who the video should be sent to.

Video bridge 104 receives the video message parameters. A video message determiner 706 then determines video from video storage 109 to form a video message. For example, video message determiner 706 uses the time period to extract the video from that time period from video storage 109. Also, if video is being sent in real-time, some of the video may be streamed to client 108-2 without storing it. For example, the video from before the contextual trigger may be retrieved from storage. Then, as more video is received, it may be streamed to client 108-2.

Particular embodiments may be used in textual instant messaging but also may be used with desktop sharing applications, whiteboarding, and other rich media applications. Users may open multiple video and text messaging sessions and randomly and quickly engage any session that is desired by providing focus on windows 202.

The video message may allow the second user to readily see kinesthetic clues like facial images and expressions as messages are read and/or received. Thus, additional context is provided in a text messaging session. This enriches the text messaging session but allows a user to leverage the advantages of text messaging.

Although the description has been described with respect to particular embodiments thereof, these particular embodiments are merely illustrative, and not restrictive. Although instant messaging is described, particular embodiments may be used in other applications.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time. The sequence of operations described herein can be interrupted, suspended, or otherwise controlled by another process, such as an operating system, kernel, etc. The routines can operate in an operating system environment or as stand-alone routines occupying all, or a substantial part, of the system processing. Functions can be performed in hardware, software, or a combination of both. Unless otherwise stated, functions may also be performed manually, in whole or in part.

In the description herein, numerous specific details are provided, such as examples of components and/or methods, to provide a thorough understanding of particular embodiments. One skilled in the relevant art will recognize, however, that a particular embodiment can be practiced without one or more of the specific details, or with other apparatus, systems, assemblies, methods, components, materials, parts, and/or the like. In other instances, well-known structures, materials, or operations are not specifically shown or described in detail to avoid obscuring aspects of particular embodiments.

A "computer-readable medium" for purposes of particular embodiments may be any medium that can contain and store the program for use by or in connection with the instruction execution system, apparatus, system, or device. The computer-readable medium can be, by way of example only but not by limitation, a semiconductor system, apparatus, system, device, or computer memory.

Particular embodiments can be implemented in the form of control logic in software or hardware or a combination of both. The control logic, when executed by one or more processors, may be operable to perform that which is described in particular embodiments.

A "processor" or "process" includes any hardware and/or software system, mechanism or component that processes data, signals, or other information. A processor can include a system with a general-purpose central processing unit, multiple processing units, dedicated circuitry for achieving functionality, or other systems. Processing need not be limited to a geographic location, or have temporal limitations. For example, a processor can perform its functions in "real time," "offline," in a "batch mode," etc. Portions of processing can be performed at different times and at different locations, by different (or the same) processing systems.

Reference throughout this specification to "one embodiment", "an embodiment", "a specific embodiment", or "particular embodiment" means that a particular feature, structure, or characteristic described in connection with the particular embodiment is included in at least one embodiment and not necessarily in all particular embodiments. Thus, respective appearances of the phrases "in a particular embodiment", "in an embodiment", or "in a specific embodiment" in various places throughout this specification are not necessarily referring to the same embodiment. Furthermore, the particular features, structures, or characteristics of any specific embodiment may be combined in any suitable manner with one or more other particular embodiments. It is to be understood that other variations and modifications of the particular embodiments described and illustrated herein are possible in light of the teachings herein and are to be considered as part of the spirit and scope.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

Additionally, any signal arrows in the drawings/Figures should be considered only as exemplary, and not limiting, unless otherwise specifically noted. Furthermore, the term "or" as used herein is generally intended to mean "and/or" unless otherwise indicated. Combinations of components or steps will also be considered as being noted, where terminology is foreseen as rendering the ability to separate or combine is unclear.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The foregoing description of illustrated particular embodiments, including what is described in the Abstract, is not intended to be exhaustive or to limit the invention to the precise forms disclosed herein. While specific particular embodiments of, and examples for, the invention are described herein for illustrative purposes only, various equivalent modifications are possible within the spirit and scope, as those skilled in the relevant art will recognize and appreciate. As indicated, these modifications may be made to the present invention in light of the foregoing description of illustrated particular embodiments and are to be included within the spirit and scope.

Thus, while the present invention has been described herein with reference to particular embodiments thereof, a latitude of modification, various changes and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit. It is intended that the invention not be limited to the particular terms used in following claims and/or to the particular embodiment disclosed as the best mode contemplated for carrying out this invention, but that the invention will include any and all particular embodiments and equivalents falling within the scope of the appended claims.

We claim:

1. A method, comprising:
   determining a capture of video from a first user, wherein the captured video begins before receiving a first text message from a second user for a communication session;
   determining a contextual trigger for the communication session between the first user and the second user, wherein the contextual trigger indicates focus by the first user on the communication session with the second user;
   determining a second text message inputted by the first user in the communication session;
   determining a point in the captured video based on a time at which the contextual trigger is determined;
   generating, by a computing device used by the first user, a video message of the first user in the communication session based upon the determined point in the captured video, wherein a portion of the captured video is not included in the video message as generated from the computing device used by the first user, and wherein the video message comprises captured video of the first user for a predetermined amount of time before the time at which the contextual trigger is determined; and
   sending the second text message and the video message from the computing device used by the first user to the second user such that a reaction of the first user reading the first text message is visible by the second user via the video message.

2. The method of claim 1, wherein the video message comprises captured video of the first user at least until substantially around when the first user requests sending of the second text message.

3. The method of claim 1, further comprising receiving an input from the first user requesting the sending of the second text message, wherein the sending of the second text message and the video message is performed upon receiving the sending input request from the first user.

4. The method of claim 1, further comprising:
   streaming the captured video to a video bridge for storage, wherein generating the video message comprises determining video parameters, and wherein the sending of the video message comprises sending the video parameters to the video bridge, the video parameters indicating which portions of the captured video in the video bridge storage should be sent to the second user.

5. The method of claim 1, further comprising:
   receiving a continuous capture of video for the first user, wherein the sending the video message comprises sending a second portion of the captured video.

6. The method of claim 1, wherein the communication session comprises an instant messaging conversation of text messaging and video messaging.

7. The method of claim 1, wherein the contextual trigger comprises a detection of focus by the first user in a window in which the communication session is taking place.

8. The method of claim 7, wherein the contextual trigger comprises at least one of a typing action, a mouse over, and a selection of the window, by the first user.

9. The method of claim 1, further comprising:
   determining a second contextual trigger indicating focus of the first user on a first window;
   determining a third text message inputted by the first user in a second conversation with a third user associated with the first window;
   generating a second video message associated with the first user in the second conversation based upon a time at which the second contextual trigger is determined; and
   sending the third text message and the second video message to the third user, wherein the captured video from the first user is not sent to the second user when focus is not detected on a second window.

10. A non-transitory computer-readable storage medium comprising:
    logic encoded medium therein for execution by one or more computer processors, and when executed executable operable to:
    determine a capture of video from a first user;
    determine a contextual trigger for a communication session between a first user and a second user, wherein the contextual trigger indicates focus by the first user on the communication session with the second user;
    determine a text message inputted by the first user in the communication session;
    determine a point in the captured video based on a time at which the contextual trigger is determined;
    generate, by the one or more computer processors, a video message of the first user in the communication session based upon the determined point in the captured video, wherein a portion of video of the captured video is not included in the video message, and wherein the video message comprises captured video of the first user for a predetermined amount of time before the time at which the contextual trigger is determined; and
    send the text message and the video message to the second user.

11. The computer-readable storage medium of claim 10, wherein the video message comprises the captured video of the first user at least until substantially around when the first user requests sending of the second text message.

12. The computer-readable storage medium of claim 10, wherein the logic when executed is further operable to send the second text message and the video message upon receiving an input from the first user requesting the sending of the second text message.

13. The computer-readable storage medium of claim 12, wherein the logic when executed is further operable to stream the captured video for the video message to a video bridge for storage, wherein the generation of the video message comprises logic when executed that is operable to determine video parameters, and wherein the logic when executed is further operable to send the video message with the video parameters to the video bridge, the video parameters indicating which portions of the captured video in the video bridge storage should be sent to the second user.

14. The computer-readable storage medium of claim 10, wherein the logic when executed is further operable to receive a continuous capture of video for the first user and send a second portion of the captured video.

15. The computer-readable storage medium of claim 10, wherein the communication session comprises an instant messaging conversation of text messaging and video messaging.

16. The computer-readable storage medium of claim 10, wherein the contextual trigger comprises a detection of focus by the first user in a window in which the communication session is taking place.

17. The computer-readable storage medium of claim 16, wherein the contextual trigger comprises at least one of a typing action, a mouse over, and a selection of the window, by the first user.

18. The computer-readable storage medium of claim 10, further executable to:
determine a second contextual trigger indicating focus of the first user on a first window;
generate a third text message inputted by the first user in a second conversation with a third user associated with the first window;
generate a second video message associated with the first user in the second conversation based upon a time at which the second contextual trigger is determined; and
send the third text message and the second video message to the third user, wherein the captured video from the first user is not sent to the second user when focus is not detected on a second window.

19. A method, comprising:
sending a first text message to a first user from a second user, wherein video capturing of the first user begins before the first text message is sent for a communication session;
receiving a second text message and a video message from the first user for the communication session between the first user and the second user;
displaying the text message from the first user; and
displaying, by a computing device used by the second user, the video message from the first user, wherein the video message is received when text message is received and includes a first portion of video of the first user from a predetermined amount of time prior to when the first user is considered active based on a contextual trigger indicating a focus of the first user in the communication session such that a reaction of the first user reading the first text message is visible by the second user via the video message, wherein a second portion of video captured prior to the predetermined amount of time prior to when the user is considered active is not included in the video message.

20. The method of claim 19, further comprising:
receiving a user input from the second user selecting the second text message;
retrieving the video message associated with the second text message from storage; and
re-displaying the video message by the computing device to replay the reaction of the first user reading the first text message.

21. An apparatus, comprising:
one or more processors; and
logic encoded in one or more tangible storage media for execution by the one or more computer processors, and when executed operable to:
determine a capture of video from a first user, wherein the captured video begins before receiving a first text message from a second user for a communication session;
determine a contextual trigger for the communication session between the first user and the second user, wherein the contextual trigger indicates focus by the first user on the communication session with the second user;
determine a second text message inputted by the first user in the communication session;
determine a point in the captured video based on a time at which the contextual trigger is determined;
generate, by the one or more computer processors in the apparatus, a video message of the first user in the communication session based upon the determined point in the captured video, wherein a portion of the captured video is not included in the video message as generated from the apparatus used by the first user, and wherein the video message comprises captured video of the first user for a predetermined amount of time before the time at which the contextual trigger is determined; and
send the second text message and the video message to the second user from the apparatus used by the first user to the second user such that a reaction of the first user reading the first text message is visible by the second user via the video message.

22. A system, comprising:
video storage configured to store video captured of a first user, wherein the stored video is captured beginning before receiving a first text message from a second user for a communication session;
a first device used by the first user, the first device comprising:
a contextual trigger determiner configured to determine a contextual trigger in the communication session between the first user and the second user, wherein the contextual trigger indicates focus by the first user on the communication session with the second user;
a text message determiner configured to determine a second text message inputted by the first user in the communication session;
a video message generator configured to determine a point in the stored video based on a time at which the contextual trigger is determined and generate a video message of the first user in the communication session based upon the determined point in the stored video, wherein a portion of video stored in the video storage is not included in the video message, the video message generated from the first device using a second portion of video stored in the video storage, the second portion of video comprising video of the first user for a predetermined amount of time before the time at which the contextual trigger is determined; and a sender configured to send the text message and the video message to the second user; and a second device used by the second user, the second device being configured to receive and display the second text message and the video message such that a reaction of the first user reading the first text message is visible by the second user via the video message.

23. The system of claim 22, wherein the second device is configured to:

accept user input from the second user selecting the second text message;

retrieve the video message associated with the second text message from a video message storage; and re-display the video message to replay the reaction of the first user reading the first text message.

* * * * *